United States Patent [19]

Kosky et al.

[11] Patent Number: 5,471,937
[45] Date of Patent: Dec. 5, 1995

[54] SYSTEM AND METHOD FOR THE TREATMENT OF HAZARDOUS WASTE MATERIAL

[75] Inventors: John P. Kosky, Clearwater; John F. Jones, Sanibel Island, both of Fla.

[73] Assignee: MEI Corporation, Clearwater, Fla.

[21] Appl. No.: 285,549

[22] Filed: Aug. 3, 1994

[51] Int. Cl.$^6$ ..................................................... F23J 11/00
[52] U.S. Cl. ........................... 110/345; 110/211; 110/346; 110/229
[58] Field of Search ..................................... 110/236, 237, 110/238, 346, 345, 211, 215, 229; 34/478, 479; 588/213, 214, 223, 230

[56] References Cited

U.S. PATENT DOCUMENTS

| | | | |
|---|---|---|---|
| 4,432,290 | 2/1984 | Ishii et al. | 110/346 |
| 4,732,092 | 3/1988 | Gould | 110/229 |
| 4,840,129 | 6/1989 | Jelinek | 110/229 |

Primary Examiner—Denise L. Gromada
Assistant Examiner—Susanne C. Tinker
Attorney, Agent, or Firm—Shlesinger Arkwright & Garvey

[57] ABSTRACT

A method for the destruction of contaminated waste material comprising the steps of sufficiently heating the waste material in an oxygen deficient atmosphere to pyrolyze the material thereby producing a volatile fuel gas stream and a decontaminated solid residue, separately removing the fuel gas stream and the decontaminated solid residue, adjusting the stoichiometric ratio of the fuel gas stream reactant components for combustion downstream, oxidatively combusting the adjusted fuel gas stream to produce a low velocity, low oxygen gas stream, and a high velocity, low oxygen carrier gas stream, recycling at least a portion of the high velocity, low oxygen carrier gas stream for direct contact with the waste material to provide heat for pyrolysis of the same, contacting at least a portion of the low velocity, low oxygen carrier gas stream with water to produce an oxygen rich, substantially inert, heat exchange gas stream and indirectly heating the contaminated material with the heat exchange gas stream to provide supplemental heat.

20 Claims, 2 Drawing Sheets

SYSTEM AND METHOD FOR THE TREATMENT OF HAZARDOUS WASTE MATERIAL

FIELD OF INVENTION

The present invention relates to a system and method for the treatment and disposal of toxic and/or hazardous waste material via staged thermal reactions including recycle of reaction gases.

BACKGROUND OF THE INVENTION

Toxic and hazardous wastes encompass a wide variety of chemical pollutants examples of which include distilled petroleum products, crude oil, substituted and unsubstituted aromatic and aliphatic organic solvents, chemical industry by products, PCB's, medical waste and waste products from the food industries such as fats and oils.

Landfills, illegal dumping and leakage from underground storage tanks has resulted in significant contamination of soil with these wastes. Efforts are being made at both the federal and state level to identify those sites requiring immediate clean up. Remediation generally includes excavating the contaminated soils and hauling them to an off-site facility for combustion or incineration. Incineration has been found to be not entirely satisfactory since the plants are often large, must be constructed in rural areas away from the population and often create pollution themselves by converting the solid and liquid toxic waste into air borne pollutants. In addition, the energy requirements of conventional prior art incineration is substantial, resulting in high operational costs.

In the past, the use of combustion or thermal remediation for the disposal of petroleum distillates and organic hazardous wastes has led to highly specific systems tailored to the particular pollutant to be treated. These prior art processes require the incorporation of extensive secondary pollution control systems to deal with the undesirable by products of incineration such as carbon monoxide, oxides of nitrogen, oxides of sulphur, ozone, particulates and heat emitted to the environment, otherwise known as thermal pollution. These control systems result in an overall increase in both the size and cost of the equipment. Such plants are not truly mobile and are constructed at a relatively high cost while at the same time being limited in use to locations requiring extended remediation efforts. Afterwards, the plant must be dismantled and removed from the site. Further, for treatment at toxic waste sites located in densely populated areas the mobile site remediation equipment must conform to more strict thermal and noise abatement requirements.

The preferred prior art method of hazardous waste incineration is indirect pyrolysis since that method produces the least amount of pollution by-products. However, indirect pyrolysis must be fueled by external sources and is therefore unattractive for use in incineration systems, particularly the self-contained mobile system.

Most prior art thermal processing of hazardous waste employs rotating drums, rotating kilns, liquid injection incinerators or fluidized bed technology. Fluidized bed systems are described in U.S. Pat. No. 5,186,901 (Bayer et al.), U.S. Pat. No. 5,101,714 (Hirschberg et al.) and U.S. Pat. No. 5,145,826 (Hirschberg et al.). Exemplary of rotary kiln systems are U.S. Pat. No. 5,176,445 (Mize), U.S. Pat. No. 5,152,233 (Spisak) and U.S. Pat. No. 4,974,528 (Barcell). Rotary drum type evaporators for use in the treatment of soils or other contaminated solid substrates are U.S. Pat. No. 5,164,158 (Brashears et al.), U.S. Pat. No. 5,170,726 (Brashears et al.) and U.S. Pat. No. 5,054,931 (Farnham et al.).

Prior art fluidized bed systems have been found ineffective for use with pyrolysis due to both the need for highly classified particulates and to char build-up. Also, it is extremely difficult and expensive to effectively seal a rotating cylinder such as a kiln or drum against the leakage of gases into or out of the reactor.

Incineration of solids is known to produce potentially valuable heat energy along with carbon dioxide, nitrogen and residual ash. Pyrolysis i.e. incineration with a deficiency of air, allows the recovery of certain fuel gases and chemicals generated from the waste. Thermal oxidation is a type of incineration employed for the oxidation of contaminated fumes generated during incineration of a solid. Although prior art systems have incorporated these various remediation techniques in an effort to maximize efficiency of waste destruction while minimizing fuel consumption, such attempts have been met with limited success.

The failure of the prior art to efficiently recycle energy is partly due to the inability of such systems to distinguish between different recycle streams. If recycle streams are used in a staged chemical reaction process of the type having numerous different chemical reactions taking place, the recycle streams themselves must have appropriate chemical and physical properties. For example, the reaction conditions required for pyrolysis are substantially different than those for an oxidative combustion process. If maximum combustion efficiency and energy recovery is to be obtained, recycle streams must be tailored to the type of combustion reaction occurring.

Most of the prior art processes for destruction of hazardous or toxic organic wastes are incinerative in nature. The process described herein however, differs in that it is a tightly controlled, staged thermochemical reaction process. Incineration on the other hand, is a relatively uncontrolled process employing a flame to oxidize combustible materials thereby yielding a wide, unpredictable variety of gas products and incombustible ash residues. Also both the combustive materials and residues remain resident in the process for the entire incineration cycle time. Conversely, thermochemical reaction processes are tightly controlled, and therefore consistently generate specific quantities of desired products and by-products.

The basic thermochemical reactions used in the process described herein are tailored cases of pyrolysis and combustion based upon thermochemical equilibria. Pyrolysis is an anaerobic (oxygen free) chemical reaction process which employs heat to reduce complex chemicals into their essential building blocks. In the case of hydrocarbons, the produced product gases, primarily methane and hydrogen, are suitable for use as a low value fuel gas. Pyrolysis also produces a solid char residue of finely divided carbon. Although the product concentrations may vary, pyrolysis will consistently produce the same products and by-products, independent of the identity of the initial hydrocarbons processed. Combustion is a controlled chemical reaction as well, and in the case of oxidative combustion, also produces heat and/or light. A controlled combustion process, using a fuel having a specific chemical composition, will produce consistent quantities and identities of desired reaction products and by-products.

In the process described herein, a tailored pyrolysis reaction using a calculated water vapor content, is employed to simultaneously (1) convert the hydrocarbon feedstock into gases having a desired fuel value and (2) prevent any solid carbon from forming by converting it to gases with a fuel value. These gases, are then used as fuel for the secondary oxidative combustion stages, the heat from which is recycled back to the endothermic evaporator/pyrolysis stage. Because the process is designed to operate under conditions (e.g. environmental clean-up) where the composition of hydrocarbons in the feed stock will be variable, post-processing of the exhaust gases from the pyrolyzer reactor is necessary to produce a high quality fuel gas for secondary oxidative combustion thermochemical processes. This fuel gas will therefore have a consistent composition, ensuring a tightly controlled and predictable thermochemical reaction processes will take place once it is combusted downstream.

To efficiently recycle the energy produced by the oxidative combustion process, two recycle streams are required having different chemical and physical properties. A first recycle stream is injected back into the flash evaporator section of the pyrolysis reactor. This stream is obtained from a first stage oxidative combustion process. It must be of high temperature and pressure and be substantially oxygen free. To obtain this recycle stream, the first stage of the oxidative combustion process is performed under oxygen poor conditions. A second recycle stream is also required to indirectly heat the evaporator pyrolyzer reactor through heat exchange. This recycle stream must near ambient pressure and be rich in both steam and oxygen. In the present invention, this recycle stream is provided by a second oxidative combustion stage, the hydrolyzer reactor/module, operated under appropriate conditions sufficient to produce a recycle stream having the desired properties.

No previous prior art system produces a high temperature, low oxygen, recycle gas stream for use as a direct carrier gas in the pyrolysis reaction. The present invention employs post-pyrolysis multistage combustion of the generated fuel gases. These gases are adjusted to the required sub-stoichiometric oxygen concentration followed by parallel combustion in either a thermal oxidizer reactor or a fuel gas combusting turbine. The resultant low oxygen, high temperature, high pressure exhaust gases from the turbine are directly recycled into the evaporator section of the pyrolysis chamber to assist in flash evaporation of the volatile contaminants from the solid material. The exhaust gases from the oxidizer reactor are in turn converted into blends of hot gases and steam for indirect heat exchange of the pyrolysis reactor.

A need has therefore existed in the art to provide a multi-stage system and method for the destruction of toxic and/or hazardous waste materials, via incineration and pyrolysis, which efficiently recycles the gaseous by-products generated from the destruction of the hazardous waste including heat recovery.

OBJECTS AND SUMMARY OF THE INVENTION

It is therefore an object of the present invention to provide a system and method for the destruction of toxic and hazardous waste incorporating both pyrolysis and multi-stage combustion whereby the thermal energy generated within the system is usefully returned to the pyrolysis unit to drive the pyrolysis reaction. The multi-stage combustion or thermochemical reaction operates to combust gaseous fuels produced during the pyrolysis reaction. Thus, the contaminants themselves are converted into a major fuel source for the process and the need for supplemental fuel is minimized.

A further object of the present invention is to provide a system and method for the destruction of toxic and hazardous waste employing multi-stage combustion thermochemical reaction whereby gas generated from the pyrolysis reaction is directed into both a thermal oxidizer combustion reactor and a gas combusting turbine for parallel combustion. The exhaust from the oxidizer is converted into hot gases and steam to provide supplemental heat to the pyrolysis reactor while the low oxygen turbine exhaust is directed into the pyrolysis reactor as a carrier gas.

A still further object of the present invention is to provide a system and method for the destruction of toxic and hazardous waste which may be employed as a self-contained unit having modular design so that the system components may be readily interchanged and tailored for the destruction of a specific toxic material. For instance, a drum pyrolyzer for volatilization and destruction of containerized organic toxics can be used to replace a mechanical solids feeder. In addition, other elements of this system such as char combustors or scrubbers can be integrated within the system without overburdening the overall energy requirements.

A still further object of the present invention is to provide a system and method for the destruction of toxic and hazardous waste which is equally effective for a wide variety of toxic materials such as petroleum distillates, crude oils, biological and medical wastes and other organic material.

A still further object of the present invention is to provide a system and method for the destruction of toxic and hazardous waste which is designed to capture and recycle thermal energy generated during the combustion process and the conversion of the waste into gaseous fuels for use in the system.

Yet another object of the present invention is to provide a system and method for the destruction of toxic and hazardous waste that will significantly reduce the production of by-product pollutants such as carbon monoxide, oxides of nitrogen, ozone, particulates and thermal pollutants.

Another object of the present invention is to provide a system and method for the destruction of toxic and hazardous waste that incorporates pyrolytic combustion to minimizes the need for external fuel sources thereby resulting in a more compact, self-contained mobile system readily transportable to a toxic waste site.

These and other objects of the present invention are achieved by providing a method for the destruction of toxic and hazardous waste including the steps of heating the toxic and hazardous waste in the absence of air for a sufficient period of time to convert the waste into a gaseous component and a non-toxic solid residue, separately combusting at least a first portion of the gaseous component within a thermal oxidizing combustion reactor followed by combusting a second gaseous component within a turbine, hydrolyzing the exhaust from the thermal oxidizing combustion reactor to produce a blend of hot gases and steam, redirecting the steam to the pyrolysis reactor for heat exchange with the reactor and directing a low oxygen, high velocity carrier gas stream from the turbine into the pyrolysis reactor to flash incoming waste and maintain pyrolysis reaction rates.

The present invention is also directed to a system for destroying contaminated waste material comprising, a pyrolysis reactor for heating waste material in an oxygen deficient atmosphere to pyrolyze the material and produce a volatile fuel gas stream and a decontaminated residue, means for separately removing the volatile fuel gas stream and the decontaminated residue, means for analyzing the fuel content, water content, oxygen content and heat content of the fuel gas stream, adjustment means for selectively adjusting the stoichiometric ratio of the fuel gas stream reactant components for downstream combustion, means for combusting the adjusted fuel gas stream to produce a low velocity, low oxygen gas stream and a high velocity, low oxygen carrier gas stream, recycle means for directing the high velocity, low oxygen carrier gas stream into the pyrolysis reactor to provide heat for pyrolysis, means for hydrolyzing the low velocity, low oxygen carrier gas stream to produce an oxygen-rich, substantially inert heat exchange gas stream and means for indirectly heating the pyrolysis reactor with the oxygen-rich, substantially inert heat exchange stream to provide supplemental heat for pyrolysis.

DETAILED DESCRIPTION OF THE DRAWING

DETAILED DESCRIPTION OF THE PREFERRED EMBODIMENT

Figure 1:
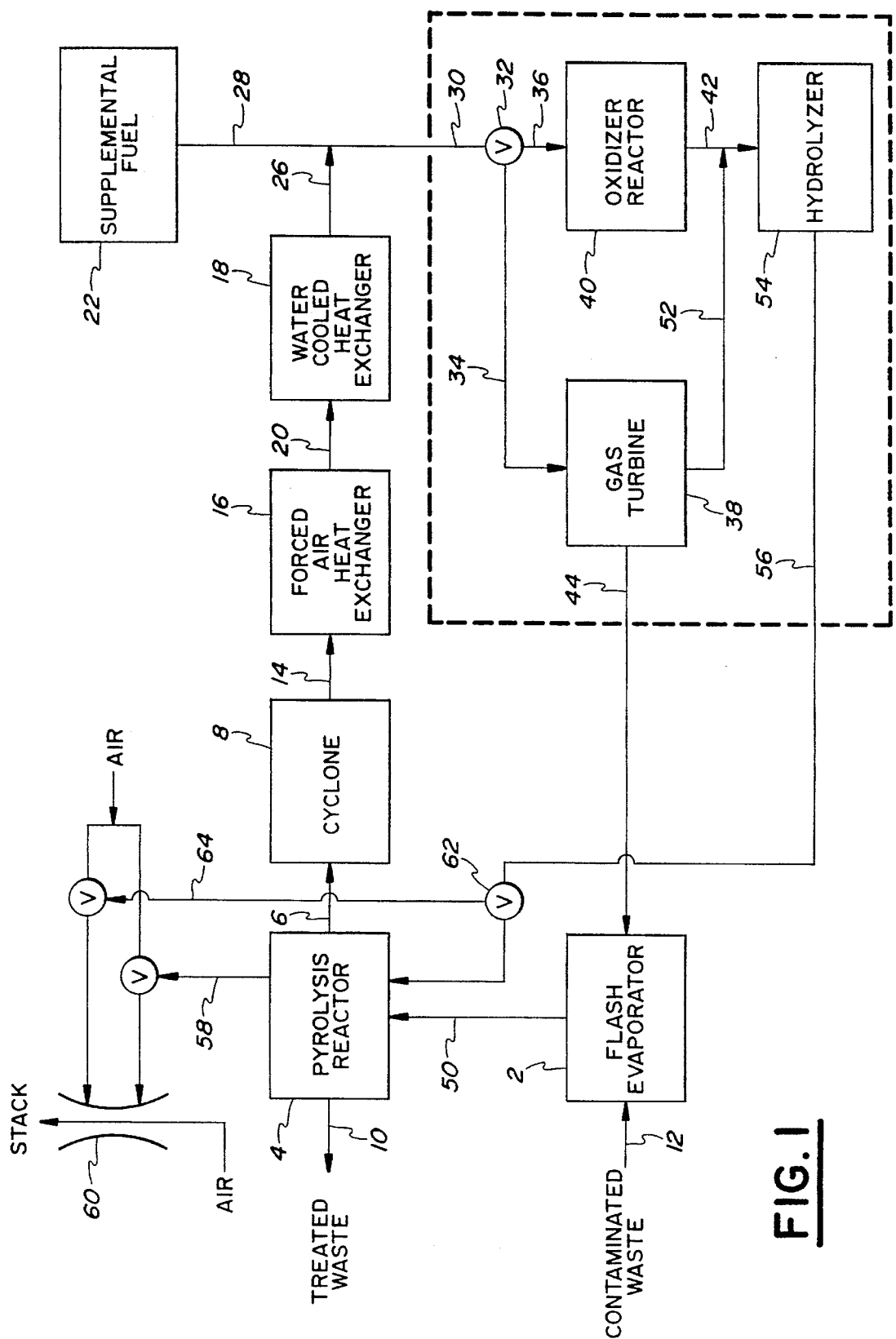
FIG. 1 is a schematic diagram illustrating the system and method of toxic and hazardous waste destruction according to the present invention.

Turning now to FIG. 1, the present invention is shown schematically. The system described herein is discussed in terms of treatment of solid substrates such as soil contaminated with hydrocarbons. However it should be understood that with slight modification to the overall system, the process can be equally applied to treatment of gases, liquids and sludges, drummed hazardous waste, medical waste or other toxic or hazardous material since the present system is designed to readily allow interchange of the various components without departing from the scope of the overall invention. For example, medical waste would require different material handling than contaminated soil. Therefore, a different conveying means would be employed for reasons of efficiency.

Contaminated waste or soil from a hazardous waste site is loaded onto one or more feed hoppers and conveyed in a feed stream 12 from the hoppers by conventional enclosed conveying equipment such as a screw conveyor or auger. The contaminated soil will pass through gated knife or rotary vane valves that effectively seal the entrance into a flash evaporator section 2. The gated knife valves or feeder locks purge the contaminated material into the evaporator section 2 without allowing air to enter the reactor. Because the reaction within the evaporator 2 and pyrolysis reactor 4 is conducted in the absence of oxygen, both the entrance to the evaporator 2 and the exit 10 through the pyrolysis reactor 4 are provided with the gated knife valves or similar devices to effectively seal the evaporator 2 and pyrolysis reactor 4 from leakage.

Pyrolysis is the decomposition of organic substances by heat and in the absence of oxygen. With respect to pyrolysis of hazardous waste, destruction may occur in two steps. Initially the waste is heated until the volatile components are separated. The volatiles are usually water and combustible gases. These gases are subsequently burned under controlled conditions to ensure pyrolysis of all hazardous components. Since conventional pyrolysis is an endothermic reaction, heat must be supplied from an outside source. Applicant's separation of the combustion process into two controlled steps results in waste destruction efficiencies of 99.999% to 99.9999%.

Pyrolysis within the scope of the present invention is especially applicable to the treatment of contaminated soils, waste stored in drums or containers which are not easily drained, or sludge material which is either too viscous, too abrasive or too variable in consistency to be conventionally incinerated. Additionally, pyrolysis within the scope of the present invention allows treatment of the waste to undergo partial or complete phase change during thermal processing. For example, plastics and high-residue materials such as high ash liquids and sludges having light, easily entrained solids that usually require extensive stack-gas clean up may now be treated.

Within the scope of the present invention the pyrolytic reactor 4 is specifically adapted to handle the particular hazardous waste to be treated. It is closely associated with flash evaporator 2 and if desired may be combined with the evaporator into a single reactor. If contaminated soils are to be treated, the pyrolytic reactor will be provided with a vibrating bed transport system that allows the soil to be sufficiently intermixed with the hot gases generated within the pyrolyzer. This arrangement decreases retention times for desorption of the volatile components from the soil while increasing material feed rates into the reactor 4. Further, the pyrolytic reactor 4 according to the present invention may be jacketed or otherwise provided with a heat exchange device to allow indirect heat exchange with a fluid such as high temperature steam. Supplemental external or internal electrical or fuel gas fired heating sources may also be used as required.

The incoming contaminated soil 12 passes through the flash evaporation chamber 2 where it is subjected to a high temperature, high pressure, low oxygen gas stream having a temperature of about 1500° F. (+1000° /–500° F.). After flash evaporation and pre-heating within evaporator 2, the soil enters pyrolytic reactor 4 where it is agitated and intermixed on the vibrating bed. The bed is positioned within the chamber, has high thermal efficiency, produces less dust and particulates then conventional rotating kilns or drums and will not adversely effect chamber seals. The vibrating, cascading bed within the pyrolyzer reactor 4 functions to increase the exposed surface area of contaminated soil while in the reactor 4.

In the preferred embodiment, the reaction temperature is maintained between about 700° to 1400° F. However, reaction temperatures as high as 2000° F. may be provided depending upon the type of material to be pyrolyzed. If temperatures above 1400° F. are required, supplemental heating units may be employed.

The gases generated within the pyrolytic reactor 4 are held at reaction temperatures for a sufficient period of time to allow them to pyrolyze into simpler forms. As noted earlier, pyrolysis is conducted in an oxygen deficient environment and in the presence of water concentrations well above stoichiometric requirements thereby eliminating carbon deposition within the reactor. In the preferred embodiment, residence time for the gases within the reactor extends between about five to about fifteen seconds. The contaminated soil or other material is disposed on the cascading vibrating bed to a depth of about one inch with retention time in the pyrolytic reactor of about nine minutes plus or minus about six minutes. Retention time for the contaminated soil or other materials to be treated must be sufficient to evaporate all volatile organics and water from the soil.

As noted earlier, if higher molecular weight organic chemicals having lower volatility are treated by pyrolysis, supplemental heating may be provided to shorten retention times within the reactor. For example, flat panel refractory-based heating panels may be provided. A preferred refractory-based heating panel is available from the Aerosplex division of Zircar Products Inc.

Methane, carbon monoxide and hydrogen gases generated during pyrolysis exit the reactor 4 through fuel gas exhaust line 6. A centrifugal single or dual-stage high temperature cyclonic precipitator 8 is then employed to filter the gases. The collected particulates are directed to the treated solids stream 10 exiting the pyrolytic reactor 4. The cleaned gas stream 14 is removed from the cyclone precipitator 8 and analyzed for both fuel value and water content using appropriate instrumentation such as spectroscopy. The analyzed gas then passes through a heat exchanger 16, such as a forced air heat exchanger to adjust the heat content. Generally, about 50% of the heat content is removed. The cooled stream 20 enters a condensing heat exchanger 18 where the water vapor content of the stream is adjusted in accordance with the pre-determined value required for downstream combustion. If the fuel value of the gas stream 20 is determined to be below a required amount, it is adjusted to autogenic conditions through the addition of supplemental fuel gas such as propane from external supply 22. As a result, a constant ratio of water to fuel is maintained within the gas stream 30.

A post-condenser mixing chamber (not shown) may be provided to receive the gas stream 26 for intermixing with supplement fuel gas stream 28. For example, if the fuel value of the gas stream 20 is determined to be below that required to maintain downstream combustion i.e. the soil contained too low a value of hydrocarbons, the necessary fuel value (normally 25%–30% by weight) is maintained by injection of propane into stream 30. Control of these various parameters is by microprocessor or other device capable of monitoring upstream gas content so that appropriate adjustment can be made well in advance of downstream combustion.

After the addition of fuel to gas stream 26, the adjusted stream 30 is divided by valve 32 or other device into two separate streams. A first stream 34 contains about 10% to 30% of the volume of stream 30 while the second stream 36 contains the remaining 70% to 90% of stream 30 volume. Stream 34 is passed into a fuel gas burning turbine 38 operating at sub-stoichiometric oxygen conditions. The turbine 38 drives a generator that produces electricity and/or mechanical shaft output usable in other portions of the system. A preferred fuel gas combusting turbine is the Bastan VI or Makila T1 manufactured by the Turbomeca Co.

The second stream 36 containing the remainder of the fuel gas is directed into an oxidative combustion reactor 40 where the entering gas stream is oxidatively combusted with a sub-stoichiometric quantity of injected air. Since the water content of the gas stream, percent combustibles, fuel value and oxygen content of gas stream 36 has been adjusted, the reaction temperature within the oxidizer reactor 40 is maintained below that sufficient to allow formation of undesirable $NO_x$ i.e. not greater than 2400° F. The preadjusted BTU (fuel) content and water content of the second gas stream 36 entering the oxidizer reactor 40 ensures that the reaction temperature will not exceed 2400° F. nor drop below that required for autoignition of the fuel gases.

It can therefore be seen that by controlling both the water and fuel content of the gas stream 6 prior to combustion in the thermal oxidizer reactor 40 and turbine 38, reaction temperatures can be maintained within desired levels and adjusted over a wide range depending upon the gaseous components to be combusted. For example, unsubstituted hydrocarbons such as refined petroleum products may be combusted at a temperature range maintained between about 2000° F. and 2400° F. The actual operational temperature is adjusted within the recited temperature range to continually maximize combustion efficiency and minimize formation of undesirable by-products such as oxides of nitrogen.

For more toxic or chemically complex substituted and unsubstituted aromatic and aliphatic hydrocarbons, combustion temperatures within the oxidizer reactor 40 can be operated as high as about 3000° F. through the adjustment of the water, fuel and oxygen content of gas stream 36. Separation of the volatile gaseous by-products from the contaminated soil in pyrolytic reactor 4 followed by combustion of these gaseous products in a second stage thermal oxidizer 40 and turbine 38 results in enhanced combustion efficiency if the oxygen, fuel content and water within the gaseous stream leaving the evaporator/pyrolysis reactor 4 are adjusted. Consequently, separation and treatment of the generated gaseous components leads to an overall extremely high destruction and removal efficiency of the toxic material.

Because combustion within the oxidizer reactor 40 occurs under oxygen deficient conditions, the hot exhaust 42 gases exiting the reactor 40 have no available free oxygen. These gases have a temperature of about 2200° F.±200° F. and are composed almost entirely of carbon dioxide, water vapor, nitrogen, argon and are therefore essentially inert.

The compressed exhaust gases from the turbine however have a temperature between about 1000° F. to about 1800° F., are of a high velocity and are oxygen deficient. Since this stream is high in oxygen scavengers such as carbon monoxide it functions as an ideal carrier gas stream for the flash evaporator 2 and pyrolysis reactor 4. Between about 1% to about 10% of the turbine exhaust 44 is therefore diverted into the flash evaporator 2 of pyrolysis reactor to provide heat to the evaporator 3 and act as a high pressure carrier gas within the reactor 4. This carrier gas stream 44 flows into the pyrolytic reactor 4 in a countercurrent direction to the contaminated soil. In a preferred embodiment, the carrier gas temperature may be adjusted by a thermal control system i.e. heat exchanger (not shown) prior to entering flash evaporator 2 via stream 48 to maintain pyrolysis reaction efficiency. Velocity of the stream is about one to about ten FPS.

Figure 2:
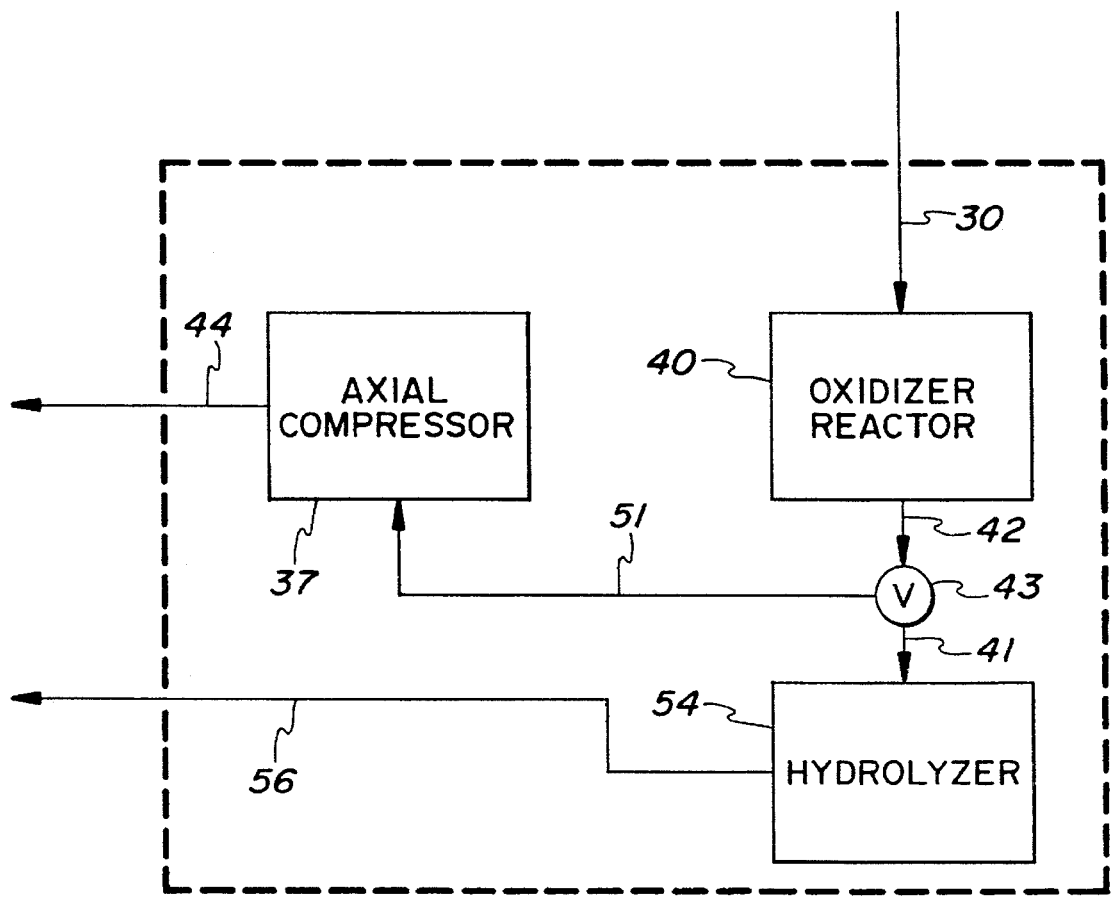
FIG. 2 is an alternative embodiment of FIG. 1.

In certain situations it may not be desirous to utilize the gas turbine. In that embodiment and as best shown in FIG. 2, the turbine is replaced by an axial compressor 37 driven by an external energy source. Adjusted stream 30 is combusted within oxidizer reactor 40 with exhaust 42 entering valve 43. Branch stream 41 enters hydrolyzer 54 while branch stream 51 is directed to axial compressor 37 where the stream pressure is suitably adjusted for injection into the flash evaporator via line 44. Prior to injection into the flash evaporator 2, the high pressure exhaust stream 44 is passed through a thermal control system i.e. forced air heat exchanger in the same manner as in the gas turbine embodiment.

Returning now to FIG. 1, the remaining turbine exhaust stream containing 90–99% of the turbine exhaust is recombined via line 52 with the oxidizer exhaust stream 42 before entering the hydrolyzer 54. Within the hydrolyzer reactor 54, water and air are injected into the gas stream. In a preferred embodiment, water is directly injected into the gas stream to obtain from about 5% to about 15% excess oxygen and to reduce the temperature of the gas stream used for indirect heat exchange with pyrolytic reactor to about 1000° F. to 1400° F. Excess air may also be injected to further combust any remaining carbon monoxide into carbon dioxide and any hydrogen gas into water thereby reducing the gas concentration leaving the hydrolyzer 54 to acceptable levels. Air injection is performed at sufficiently high temperatures to oxidize carbon monoxide and hydrogen but below that required for the formation of oxides of nitrogen. Most importantly, the cooled gases leaving the hydrolyzer reactor 54 are in the form of hot gases rich in high temperature steam, highly suited for indirect heat exchange with the pyrolyzer 4. The water required for the hydrolyzer 54 may be obtained from either the process gas stream condensate or the cooling water within the condensing heat exchanger 18.

The hot gases and steam in line 56 leave the hydrolyzer reactor 54 and are directed to the pyrolytic reactor 4 for heat exchange purposes. The steam and product gases in line 56 are as noted, made to pass through steam channels surrounding and internal to the pyrolytic reactor 4. By combining the exhaust gases 42 from the thermal oxider reactor 4 with exhaust gases 52 exiting the turbine 38 followed by treatment within the hydrolyzer, a carbon dioxide gas and high temperature, low pressure steam suitable for recycle heating purposes is produced. This gas stream possesses low concentrations of controlled pollutants while still retaining a great deal of the thermal energy produced during oxidation combustion. The thermal energy may be readily reused by transfer to the pyrolytic reactor 4 via indirect heat exchange.

Exhaust stream 56 exiting the hydrolyzer 54 has a temperature of about 1200° to about 2000° F. and is subsequently recycled through the steam jacket of the pyrolytic reactor 4. The steam heat exchanges with the reactor 4 to provide additional heat to drive the reaction. The steam has a retention time between about five to about fifteen seconds within the steam jacket depending upon reaction temperatures within the reactor 4. A selected portion of the steam exiting the hydrolyzer 54 may be diverted via valve 62 and line 64 past the pyrolytic reactor 4 to be air injected and cooled through the venturi stack arrangement 60 prior to venting into the atmosphere. Ambient air is selectively injected into the venturi stack to control system pressure and to assist in further cooling of the gases in exhaust lines 58 and 64 prior to venting into the atmosphere.

The heat exchanged steam which exits the reactor heat exchanger at exhaust 58 has a temperature of about 800° to about 1600° F. depending upon conditions within the reactor 4. This relatively cool exhaust stream is combined with the above mentioned diverted stream fraction 64 or separately injected with air after which it is sent to the venturi 60. The final system exhaust temperature is between about 350° to about 700° F. prior to venting into the atmosphere.

The devolatilized soil within the pyrolytic reactor 4 is made to pass out of the reactor chamber via stream 10. A screw conveyor or other means for removing the treated soil may be employed. Gated knife valves or other device to seal the exit from the reactor are provided as earlier noted. A cooler and moisturizer may be provided to spray the treated soil with water, reducing the temperature to about 160° F and remoisturizing the soil. The treated soil is either returned to the environment or subjected to secondary processing treatment (as is known in the art), for example removal of non-volatile contaminants such as heavy metals or the like.

The present system is well suited for mobile i.e. trailer mounted remediation. The efficient recycle of energy within the present system considerably reduces the overall size requirements for the system. Each of the various reactors may be a modular, self-contained design thereby allowing the units to be interchanged depending upon the particular toxic waste or contaminant to be treated. For example, a drum pyrolyzer reactor may be substituted for the cascading vibrating bed type described above. In addition, other supplemental reactors may be added such as char combustors, scrubbers for the stack or the like.

Control of the process is by microprocessor. Since toxic waste destruction involves large variants in terms of concentrations and compositions, sufficient "real-time" control of the fuel gases generated by the pyrolyzer must be provided so that the fuel and water content of the gases can be rapidly adjusted prior to incineration. Only then can pyrolysis and multi-stage incineration be efficiently maintained. Consequently the present invention incorporates "fuzzy logic" control for operation of the system. Fuzzy logic control is well known in the art as a means to compare the real-time measured values of a system against a pre-determined set of weighted values in an effort to determine the degree of required response to changes within a system. Thus, the present invention incorporates a combination of proportional, integral and derivative logic control with fuzzy logic processing control. The fuzzy logic control portion of the system is limited to those portions of the system where measured values tend to show the greatest variability and relatively fast real-time adjustment is required.

For example, fuzzy logic would be used to control the pyrolyzer reactor and the post-pyrolyzer oxidizer reactor since the exhaust gases leaving the pyrolytic reactor must be constantly adjusted in terms of fuel, oxygen and water content prior to combustion within the oxidizer. Proper analytical sensors and instrumentation are provided to measure temperature, pressure, flow and gas content of the various process streams. Gas analysis of the exhaust gas from the pyrolytic reactor can be performed using a infrared type continuous emission monitor. Such sensors can accurately provide instantaneous analysis of up to eight separate gases including water and total combustibles along with an instantaneous measurement response of about 0.5 seconds per gas. Further, this type of sensor can be used to measure particulate content and opacity.

Data acquired by the various sensors is preferably sent to a 386-based central processing unit (CPU) along a data bus. The data is then analyzed and sorted into various databases. The analyzed data is used to generate appropriate analog or digital signals for the control of all peripheral equipment. The data maybe presented in graphical form to the operator. Safety features such as automatic shutdown sequences are incorporated within the control system to detect defects such as binding of a turbine or valve failure. A backup CPU may also be provided independent of the primary CPU to provide insurance against computer failure. Visual and audio alarms are provided as a warning for all readings of the several databases provided by the CPU. One will measure process performance while a second contains data on equipment performance including measurements such as voltages, currents and temperature for analysis of motors, pumps and other components that require periodic maintenance or replacement. A separate database may be provided for recording the amount of material being processed, operational hours as well as emissions from the stack for regulatory purposes.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as may be applied to the central features hereinbefore set forth, and fall within the scope of the intention and of the limits of the appended claims.

We claim:

1. A method for the destruction of contaminated waste material comprising the steps of:

a) sufficiently heating the waste material in an oxygen deficient atmosphere to pyrolyze the material producing a volatile fuel gas stream and a decontaminated solid residue;

b) separately removing the fuel gas stream and the decontaminated solid residue;

c) adjusting the stoichiometric ratio of the fuel gas stream reactant components;

d) combusting the adjusted fuel gas stream to produce a low velocity, low oxygen gas stream and a high velocity, low oxygen carrier gas stream;

e) recycling at least a portion of the high velocity, low oxygen carrier gas stream for direct contact with the waste material to provide heat for pyrolysis;

f) contacting at least a portion of the low velocity, low oxygen, gas stream with water to produce an oxygen-rich, substantially inert, heat exchange gas stream; and g) indirectly heating the waste material with the heat exchange gas stream to provide heat for pyrolysis of the waste material.

2. A method as in claim 1 and wherein:

a) heating the waste material to a temperature between about 1000° F. to about 2500° F. to cause pyrolysis.

3. A method as in claim 1 and further including the step of:

a) flashing the contaminated waste material prior to pyrolyzing to volatilize the waste material.

4. A method as in claim 1 and further including the step of:

a) combusting at least a portion of the adjusted fuel gas stream with a gas burning turbine to produce the high velocity, low oxygen, carrier gas stream and to generate electrical energy.

5. A method as in claim 1 and further including the step of:

a) passing at least a portion of the low velocity, low oxygen carrier gas stream within an axial compressor to produce the high velocity, low oxygen carrier gas stream.

6. A method as in claim 1 and further including the step of:

a) removing particulate material from the fuel gas stream with a cyclone separator prior to adjusting of the stoichiometric ratio.

7. A method as in claim 1 and further including the step of:

a) analyzing the fuel, water, oxygen and heat content of the fuel gas stream prior to adjusting the stoichiometric ratio for combustion purposes.

8. A method as in claim 7 and wherein:

a) adjusting the temperature of the analyzed fuel gas stream with a forced air heat exchanger prior to combustion.

9. A method as in claim 7 and wherein:

a) adjusting the water vapor content of the analyzed fuel gas stream with a condensing heat exchanger prior to combustion.

10. A method as in claim 7 and further comprising:

a) adjusting the fuel content of the analyzed fuel gas stream prior to combustion downstream.

11. A method as in claim 1 and wherein:

a) oxidatively combusting the adjusted fuel gas stream with a sub-stoichiometric quantity of air to prevent generation of carbon monoxide and nitrous oxides during combustion.

12. A method as in claim 4 and wherein:

a) the high velocity, low oxygen carrier gas stream exhaust has a temperature of about 1000° F. to about 1800° F.

13. A method as in claim 1 and wherein:

a) adding excess oxygen while contacting the low velocity, low oxygen gas stream with water to convert residual pollutants within the stream into carbon dioxide and water.

14. A method as in claim 4 and wherein:

a) combining at least a portion of the high velocity, low oxygen carrier gas stream exhaust with the low velocity, low oxygen gas stream prior to contacting with water.

15. A method as in claim 1 and wherein:

a) oxidatively combusting the adjusted fuel gas stream at a temperature of about 2400° F. and no more than about 3000° F.

16. A method as in claim 4 and wherein:

a) combusting about 10% to about 30% of the adjusted fuel gas stream in a gas turbine to produce the high velocity, low oxygen carrier gas stream and oxidatively combusting the balance of the adjusted fuel gas stream to produce the low velocity, low oxygen gas stream.

17. A system for destroying contaminated waste material comprising:

a) a pyrolysis reactor for heating waste material in an oxygen deficient atmosphere to pyrolyze the material and produce a volatile fuel gas stream and a decontaminated residue;

b) means for separately removing the volatile fuel gas stream and the decontaminated residue;

c) means for analyzing the fuel content, water content, oxygen content and heat content of the fuel gas stream;

d) adjustment means for selectively adjusting the stoichiometric ratio of the fuel gas stream reactant components for downstream combustion;

e) means for combusting the adjusted fuel gas stream to produce a low velocity, low oxygen gas stream and a high velocity, low oxygen carrier gas stream;

f) recycle means for directing the high velocity, low oxygen carrier gas stream into the pyrolysis reactor to provide heat for pyrolysis;

g) means for hydrolyzing the low velocity, low oxygen carrier gas stream to produce an oxygen-rich substantially inert heat exchange gas stream; and h) means for indirectly heating the pyrolysis reactor with the oxygen-rich, substantially inert heat exchange stream to provide heat for pyrolysis.

18. A system as in claim 17 and wherein:

a) said means for combusting including an oxidizer reactor to combust said adjusted fuel gas stream and produce said low velocity, low oxygen gas stream.

19. A system as in claim 17 and wherein:

a) said means for combusting including a gas burning turbine to combust said adjusted fuel gas stream and produce said high velocity, low oxygen carrier gas stream.

20. A system as in claim 17 and wherein:

a) said means for combusting including an axial compressor to produce said high velocity, low oxygen carrier gas stream.

\* \* \* \* \*